3,459,728
BASIC MONOAZO DYES
Roland Entschel and Curt Mueller, Basel, Switzerland, and Walter Wehrli, Riehen, Switzerland, assignors to Sandoz Ltd., also known as Sandoz A.G., Basel, Switzerland
No Drawing. Continuation of application Ser. No. 344,557, Feb. 13, 1964. This application Jan. 20, 1967, Ser. No. 610,718
Int. Cl. C09b 29/00; C07c 107/06
U.S. Cl. 260—149   1 Claim

ABSTRACT OF THE DISCLOSURE

A basic dyestuff of the formula

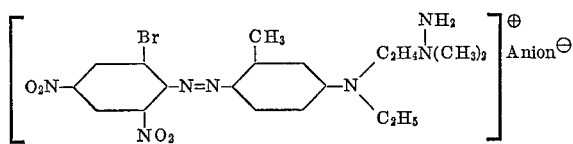

The present application is a continuation of application Ser. No. 344,557, filed Feb. 13, 1964 (now abandoned) which application is a continuation-in-part of our copending applications Ser. No. 188,837, filed on Apr. 19, 1962 (now USP 3,252,967); Ser. No. 188,889, filed on Apr. 19, 1962 (now USP 3,252,965); Ser. No. 250,787, filed on Jan. 11, 1963 (now abandoned); Ser. No. 250,788, filed on Jan. 11, 1963 (now abandoned); Ser. No. 250,789, filed on Jan. 11, 1963 (now abandoned); Ser. No. 300,068, filed on Aug. 5, 1963 (now abandoned), and relates to a basic dyestuff and its production.

More specifically, the invention relates to the dyestuff of the formula

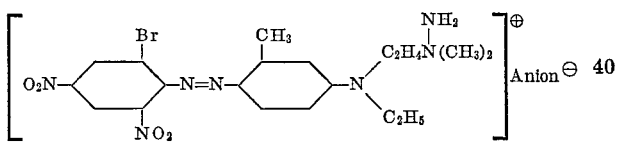

The "Anion" may be organic or inorganic, for example, the ion of methyl sulfate, sulfate, disulfate, perchlorate, chloride, bromide, iodide, phosphorus molybdate, phosphorus tungsten molybdate, benzenesulfonate, 4-chlorobenzenesulfonate, maleinate or oxalate.

The new dye is excellent for dyeing padding and printing materials of polymers containing more than 80% acrylonitrile e.g. polyacrylonitrile, e.g. Orlon (registered trademark), and copolymers containing 80–90% acryonitrile and 20–10% vinyl acetate, methyl acrylate or methyl methacrylate.

These products are marketed under the following names, most of which are registered trademarks: Acrilan (the copolymer of 85% acryonitrile and 15% vinyl acetate or vinyl pyridine), Orlon, Dralon, Courtelle, Crylor, Dynel, etc.

The dyeings on these materials obtained with the aforesaid new dye possess good fastness to light, washing, perspiration, sublimation, pleating, decatizing, pressing, water, sea water, bleaching, dry cleaning, cross dyeing, and solvents.

The new dye has very good solubility in water. It is dyed to best advantage from aqueous medium which is neutral or acid and of boiling temperature.

The commercially available retarding agents can be used in dyeing without adverse effect, although the new dye produces perfectly level dyeings on the above-named polymers and copolymers without the addition of these agents. The dye can be applied in closed equipment and under pressure, as it is highly stable in water to prolonged boiling.

In the following examples the parts and percentages are by weight and the temperatures in degrees centigrade.

EXAMPLE 1

18.4 parts of N-ethyl-N-β-chloroethyl-aminobenzene are dissolved in 100 parts of methanol and after adding 6.3 parts of 1,1-dimethyl-hydrazine the solution is heated at the boil with reflux for 24 hours. The solvent is then evaporated and the pulverised residue washed with a little benzene and dried. It is dissolved in 400 parts of water and coupled with a hydrochloric acid diazonium solution produced in the normal way from 16 parts of 1-amino-2-chloro-4-nitrobenzene. The dye is precipitated with a little sodium chloride, filtered, washed with 1% sodium chloride solution and dried. A dark red-brown powder with a melting point of 220–221° is obtained. The dye is purified by recrystallization and its melting point is then 234–236°.

Dyeing Example A 20 parts of the dye obtained according to Example 1 are intimately mixed with 80 parts of dextrin in a ball mill for 48 hours.

1 part of this preparation is pasted with 1 part of acetic acid 40%, 400 parts of distilled water at 60° are poured over the paste with constant agitation and the whole boiled for a short time. The solution is diluted with 7600 parts of distilled water, and 2 parts of glacial acetic acid are added. 100 parts of "Orlon" (registered trademark) are entered in this bath at 60°. The material was pretreated for 10–15 minutes at 60° in a bath of 8000 parts of water and 2 parts of glacial acetic acid. The dyebath is brought to 100° in 30 minutes, boiled for 1 hour and the material rinsed. A level red dyeing of excellent light fastness and very good wet fastness is obtained.

Pad dyeing Example B

A padding liquor is prepared with:

50 parts per liter of dye (corresponding to the dyeing preparation produced in the previous dyeing example)
3 parts per liter of sodium alginate
5 parts per liter of acetic acid conc.
20 parts per liter of a cationic softener e.g. a condensation product of 1 mol stearic acid and 1 mol triethanolamine
25 parts per liter of Glauber's salt Polyacrylonitrile fiber material is padded cold by the usual method on a 2 or 3 bowl pad. The pick-up is 80%. After intermediate drying for a short time at 90° on tenters, in a hot flue or by infrared radication, the material is fixed for 1–3 minutes with dry air at 170–190° on tenters, subsequently rinsed, soaped and rinsed again. A red dyeing with excellent light fastness is obtained.

Textile printing example

A printing paste is made up with:

Dye (corresponding to the dyeing preparation produced in the previous dyeing example)_____ 75
Acetic acid conc._____ 10
Sodium alignate thickening_____ 450
Cationic softener, e.g. a condensation product of 1 mol. stearic acid and 1 mol. triethanolamine____ 25
Glauber's salt_____ 25
Water _____ 415
                                              ——
Total _____ 1000

Polyacrylonitrile fiber material is printed according to the usual hand-block printing process and subsequently air-dried, steamed for 20–30 minutes in a star steamer with saturated steam, rinsed, soaped, rinsed again and dried. On polyacrylonitrile fabrics a red print with very good fastness properties is obtained.

EXAMPLE 2

37.5 parts of the dye 2-chloro-4-nitro-4'-(N-ethyl-N-dimethyl - aminoethyl) - amino-1,1'-azobenzene are dissolved at room temperature in 900 parts of chlorobenzene. 7.1 parts of freshly prepared gaseous chloramine are added to this solution at 30° with thorough stirring in the course of 3 hours. The dye salt formed is precipitated and can be isolated by filtration from the chlorobenzene.

On drying, a red powder is obtained which dyes "Orlon" (registered trademark) in level red shades of good light and wet fastness. In each case the production of chloroamine is effected by the usual methods described in the literature (cf. e.g. G. H. Coleman, Inorganic Syntheses, vol. I, p. 59; Omietanski, Inorganic Syntheses, vol V, p. 92; Gmelin, Handbook of Inorganic Chemistry, 8th edition (1926), p. 148).

An ethereal chloramine solution, produced for example according to Inorganic Syntheses I, can be used in place of gaseous chloramine.

In the latter case the dye salt is produced by dissolving 37.5 parts of the dye 2-chloro-4-nitro-4'-(N-ethyl-N-dimethyl-aminoethyl)-amino-1,1'-azobenzene at room temperature in 1500 parts of chlorobenzene. In the course of 1 hour the ether solution containing about 7 parts of chloramine is run into this solution with thorough stirring at 25–30°. The dye salt is precipitated and can be filtered off.

EXAMPLE 3

17.25 parts of 1-amino-2-chloro-4-nitrobenzene in finely divided form are stirred into 100 parts of 15% hydrochloric acid at 0°. On the addition of 27 parts of a 4n-sodium nitrite solution the diazonium salt solution is formed in almost quantitative yield within 30 minutes at 0°.

By adding 21 parts of a compound of the formula

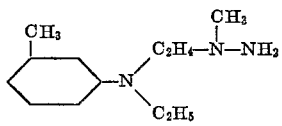

in solution in 100 parts of glacial acetic acid at 0°, the desired dye formation commences immediately. The coupling reaction is accelerated by rendering the solution weakly acid with sodium acetate. On completion of coupling the dye is filtered off, rinsed free of salt with water and dried.

The dye obtained is of low water solubility, and has the formula

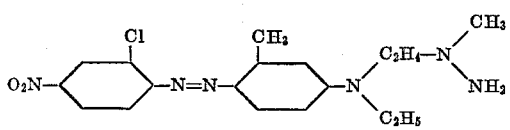

It can be used directly for dyeing polyacrylonitrile by applying it in an acid, preferably mineral acid dyebath.

The resulting dyeings are level and have good fastness properties.

The azo compound used for the production of the dye described can be obtained by the known method, i.e., by reacting N - β - chloroethyl-N-ethylmetatoluidine with an excess of monomethylhydrazine at about 100°, then separating the reaction product and distilling with high vacuum.

EXAMPLE 4

42.05 parts of the dye described in Example 3 are dissolved in 1000 parts of chlorobenzene at 80°. 19 parts of dimethylsulfate in solution in 19 parts of chlorobenzene are added dropwise with stirring, and stirring continued for 2 hours at 80–90°. The solution is allowed to cool, the salt filtered off and dried. The dye salt is obtained as a dark red powder. The compound of the formula

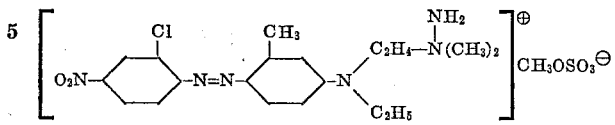

dyes polyacrylonitrile in dark red shades.

EXAMPLE 5

A dye identical to that described in Example 4 but consisting of an anionic mixture of $Cl^\ominus$ and $CH_3OSO_3^\ominus$, is obtained when 20.7 parts of the intermediate product

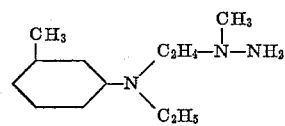

in chlorobenzene are converted into the hydrazinium salt of the formula

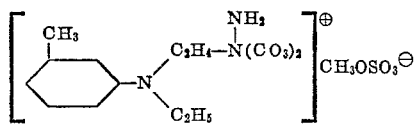

with 19 parts of dimethyl sulfated and subsequently combined with a hydrochloric acid solution of diazonium salt prepared with 17.25 parts of 1-amino-2-chloro-4-nitrobenzene, and the dye salt isolated by the known methods.

The pure chloride can be produced with the aid of an anion exchanger. The dye of the formula

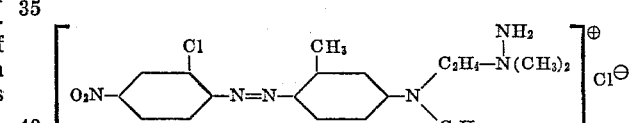

melts at 218–219°.

EXAMPLE 6

8 parts of finely pulverised, anhydrous sodium nitrite are added to 105 parts of sulfuric acid 96% at the temperature range of 60–70°. When this is completely dissolved, the nitrosylsulfuric acid formed is cooled to 15–20°. 100 parts of glacial acetic acid are run in at 20° and then 16.3 parts of 2-amino-5-nitrobenzonitrile are strewn in, followed by a further 100 parts of glacial acetic acid.

The solution is stirred for 2–3 hours at 15°. The excess nitrite is destroyed by the addition of 5 parts of urea and the solution then discharged into 350 parts of water. The diazonium salt solution at 0° is filtered and reacted with 24.2 parts of a compound of the formula

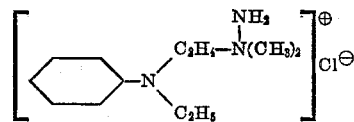

in solution in 200 parts of water.

The coupling reaction slowly commences; the pH value is brought to 5.5 by the addition of ammonia, upon which the coupling reaction takes place immediately so that the product can be filtered, rinsed and dried at once. The dye salt of the formula

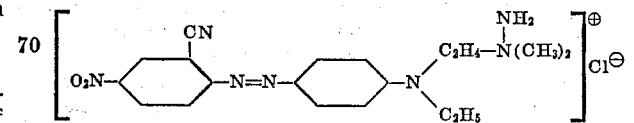

with a melting point of 196–199° dyes polyacrylonitrile fibers in ruby shades.

When in this example the diazo compound 2-amino-5-nitrobenzonitrile is replaced by 26.2 parts of 2,4-dinitro-6-bromoaniline, a corresponding dye salt is obtained which melts at 152–155° and dyes polyacrylonitrile fibers and polyester fibers modified by the introduction of acid groups in ruby shades.

The dye produced from the diazo compound 2-bromo-4-nitroaniline, melts at 226–228°. It dyes polyacrylonitrile fibers in full red shades.

When in place of 2-bromo-4-nitroaniline, 2-methylsulfonyl-4-nitroaniline is used as diazo compound, a dye of the formula

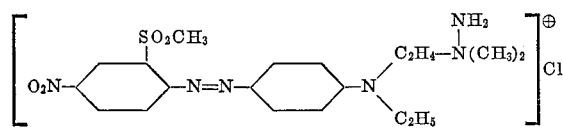

is obtained which has a melting point of 229–230° and gives ruby shades.

EXAMPLE 7

18.4 parts of N-ethyl-N-β-chloroethyl-aminobenzene are dissolved in 100 parts of ethanol. 9.1 parts of N-aminopyrrolidine are added and the solution boiled for 24 hours with reflux. The solvent is then volatilized and the pulverized residue washed with a little benzene. The dried product is dissolved in 400 parts of water and coupled with a hydrochloric acid diazonium salt solution, prepared in the normal manner from 16 parts of 1-amino-2-chloro-4-nitrobenzene. On completion of coupling some sodium chloride may be added if necessary to precipitate the dye, which is then filtered off, washed with 1% sodium chloride solution, and dried. It is obtained as a dark brown-red powder.

The coupling component named above can be prepared in the form of an aqueous solution of about 53% strength: 18.4 parts of N-ethyl-N-β-chloroethyl-aminobenzene are stirred into 20 parts of water, 9.1 parts of N-aminopyrrolidine are added and the mixture heated at 90° with vigorous stirring. After about 2 hours a clear solution is formed. 1.4 parts of dimethyl sulfate are added to bind the excess N-aminopyrrolidine. The solution is then cooled and the preparation employed for the azo coupling reaction.

EXAMPLE 8

19.8 parts of N-ethyl-N-β-chloroethyl-3-methyl-1-aminobenzene are dissolved in 100 parts of ethanol. 10.6 parts of N-aminopiperidine are added and the solution boiled for 24 hours with reflux. The solvent is then volatilized and the pulverized residue washed with a little benzene. The dried product is dissolved in 400 parts of water and coupled with a hydrochloric acid diazonium salt solution, prepared in the normal manner from 16 parts of 1-amino-2-chloro-4-nitrobenzene. On completion of coupling some sodium chloride may be added if necessary to precipitate the dye, which is then filtered off, washed with 1% sodium chloride solution, and dried. It is obtained as a dark brown-red powder.

The coupling component named above can be prepared in the form of an aqueous solution of about 53% strength: 19.8 parts of N-ethyl-N-β-chloroethyl-3-methyl-1-aminobenzene are stirred into 20 parts of water, 10.6 parts of N-aminopiperidine are added and the mixture heated at 90° with vigorous stirring.

After about 2 hours a clear solution is formed. 1.4 parts of dimethyl sulfate are added to bind the excess N-aminopiperidine. The solution is then cooled and the preparation employed for the azo coupling reaction.

EXAMPLE 9

18.4 parts of N-ethyl-N-β-chloroethyl-1-aminobenzene are dissolved in 100 parts of ethanol. 10.8 parts of N-aminomorpholine are added and the solution boiled for 24 hours with reflux. The solvent is then volatilized and the pulverized residue washed with a little benzene. The dried product is dissolved in 400 parts of water and coupled with a hydrochloric acid diazonium salt solution, prepared in the normal manner from 20 parts of 1-amino-2-bromo-4-nitrobenzene. On completion of coupling some sodium chloride may be added if necessary to precipitate the dye, which is then filtered off, washed with 1% sodium chloride solution, and dried. It is obtained as a dark brown-red powder.

The coupling component named above can be prepared in the form of an aqueous solution of about 53% strength: 18.4 parts of N-ethyl-N-β-chloroethyl-1-aminobenzene are stirred into 20 parts of water, 10.8 parts of N-aminomorpholine are added and the mixture heated at 90° with vigorous stirring. After about 2 hours a clear solution is formed. 1.4 parts of dimethyl sulfate are added to bind the excess N-aminomorpholine. The solution is then cooled and the preparation employed for the azo coupling reaction.

The aforesaid further valuable basic monoazo dyes I can be produced by the process given in the above examples. It produces violet shades when used for dyeing polyacrylonitrile.

What is claimed is:
1. A basic dyestuff of the formula

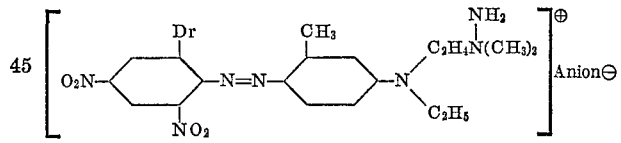

References Cited

UNITED STATES PATENTS 3,374,221  3/1968  Entschel et al. _____ 260—205
2,955,168  10/1960  Omietanski _____ 260—205

CHARLES B. PARKER, Primary Examiner

C. F. WARREN, Assistant Examiner

U.S. Cl. X.R.

8—41, 55; 260—149, 205, 577